United States Patent
Mejia et al.

(10) Patent No.: US 7,436,753 B2
(45) Date of Patent: Oct. 14, 2008

(54) CONTACT PROBE STORAGE FET SENSOR

(76) Inventors: Robert G. Mejia, 3205 N. 24th St., Boise, ID (US) 83702; Curt Nelson Van Lydegraf, 2717 W. Sugar Crest Dr., Eagle, ID (US) 83616

( * ) Notice: Subject to any disclaimer, the term of this patent is extended or adjusted under 35 U.S.C. 154(b) by 586 days.

(21) Appl. No.: 10/736,692

(22) Filed: Dec. 17, 2003

(65) Prior Publication Data
US 2005/0135224 A1 Jun. 23, 2005

(51) Int. Cl.
*G11B 7/00* (2006.01)
(52) U.S. Cl. ....................................... 369/126
(58) Field of Classification Search ................. 369/126, 369/103, 100; *G11B 9/00*
See application file for complete search history.

(56) References Cited

U.S. PATENT DOCUMENTS

| | | | |
|---|---|---|---|
| 3,842,194 A | 10/1974 | Clemens | |
| 3,920,930 A | 11/1975 | Sobczyk | |
| 4,340,956 A | 7/1982 | Miller | |
| 4,450,550 A | 5/1984 | Sterzer | |
| 4,538,165 A * | 8/1985 | Chang et al. | 257/192 |
| 4,912,822 A | 4/1990 | Zdeblick et al. | |
| 4,998,016 A | 3/1991 | Nose et al. | |
| 5,015,850 A | 5/1991 | Zdeblick et al. | |
| 5,053,995 A | 10/1991 | Kajimura et al. | |
| 5,138,174 A | 8/1992 | Tang | |
| 5,235,187 A | 8/1993 | Arney et al. | |
| 5,283,437 A | 2/1994 | Greschner et al. | |
| 5,289,004 A | 2/1994 | Okada et al. | |
| 5,323,377 A * | 6/1994 | Chen et al. | 369/126 |
| 5,329,513 A | 7/1994 | Nose et al. | |
| 5,345,815 A | 9/1994 | Albrecht et al. | |
| 5,371,728 A | 12/1994 | Sakai et al. | |
| 5,373,494 A | 12/1994 | Kawagishi et al. | |
| 5,398,299 A | 3/1995 | Nakayama et al. | |
| 5,412,641 A | 5/1995 | Shinjo et al. | |
| 5,418,363 A * | 5/1995 | Elings et al. | 250/306 |
| 5,426,631 A | 6/1995 | Miyazaki et al. | |
| 5,526,334 A | 6/1996 | Yamano et al. | |
| 5,537,372 A | 7/1996 | Albrecht et al. | |
| 5,546,374 A | 8/1996 | Kuroda et al. | |
| 5,583,286 A | 12/1996 | Matsuyama | |
| 5,610,898 A | 3/1997 | Takimoto et al. | |
| 5,679,952 A | 10/1997 | Lutwyche et al. | |
| 5,680,387 A | 10/1997 | Yamano et al. | |
| 5,751,683 A | 5/1998 | Kley | |

(Continued)

FOREIGN PATENT DOCUMENTS

EP 0 803 702 A 10/1997

(Continued)

OTHER PUBLICATIONS

MAT (machine assisted translation) of JP 10-239327.*

(Continued)

*Primary Examiner*—Nabil Z Hindi

(57) ABSTRACT

A sensing device has a cantilever disposed with a medium which is movable relative to the cantilever, and a device associated with one of the cantilever and the medium, which is responsive to changes in electrical field between the medium and the cantilever caused by a distance between the medium and the cantilever changing.

12 Claims, 3 Drawing Sheets

U.S. PATENT DOCUMENTS

| | | | |
|---|---|---|---|
| 5,751,685 A | 5/1998 | Yi | |
| 5,753,911 A | 5/1998 | Yasuda et al. | |
| 5,856,672 A | 1/1999 | Ried | |
| 5,883,705 A | 3/1999 | Minne et al. | |
| 5,923,033 A | 7/1999 | Takayama et al. | |
| 5,953,306 A | 9/1999 | Yi | |
| 5,969,345 A | 10/1999 | Williams et al. | |
| 5,994,698 A | 11/1999 | Kawade et al. | |
| 6,072,764 A | 6/2000 | Shido et al. | |
| 6,073,485 A * | 6/2000 | Kitamura | 73/105 |
| 6,218,086 B1 | 4/2001 | Binnig et al. | |
| 6,249,503 B1 * | 6/2001 | Aratani | 369/126 |
| 6,337,477 B1 | 1/2002 | Shimada et al. | |
| 6,369,385 B1 | 4/2002 | Muray et al. | |
| 6,401,526 B1 | 6/2002 | Dai et al. | |
| 6,436,794 B1 | 8/2002 | Lee et al. | |
| 6,440,820 B1 | 8/2002 | Lee et al. | |
| 6,465,782 B1 | 10/2002 | Kendall | |
| 6,477,132 B1 | 11/2002 | Azuma et al. | |
| 6,515,957 B1 | 2/2003 | Newns et al. | |
| 6,521,921 B2 * | 2/2003 | Lim et al. | 257/255 |
| 6,580,678 B2 | 6/2003 | Kondo et al. | |
| 6,665,258 B1 * | 12/2003 | Dietzel et al. | 369/126 |
| 7,008,811 B2 * | 3/2006 | Park et al. | 438/48 |
| 7,054,257 B2 * | 5/2006 | Binnig et al. | 369/126 |
| 7,212,487 B2 * | 5/2007 | Gibson | 369/126 |
| 2003/0202456 A1 | 10/2003 | Hong et al. | |
| 2005/0135199 A1 * | 6/2005 | Mejia et al. | |

FOREIGN PATENT DOCUMENTS

| | | | |
|---|---|---|---|
| EP | 0984444 A2 * | 3/2000 | |
| JP | 01-197661 A | 8/1989 | |
| JP | 08-806788 A | 4/1996 | |
| JP | 10-239327 | * 11/1998 | |

OTHER PUBLICATIONS

Patent Abstracts of Japan, vol. 013, No. 495 (P-956) Nov. 9, 1989.
Patent Abstracts of Japan, vol. 1996, No. 08, Aug. 30, 1996.
Presentation, 02 Field-Effect Transistor (FET) principles and types.
P. Vettiger, et al., "The Millipede—More than one thousand tips for future AFM data storage", May 3, 2000, IBM J. Res. Develop. vol. 44:3.
Chuck Morehouse, "Beyond Magnetic Recording—Will it be probe-based storage", IIST Workshop XVI Lake Arrowhead, Oct. 2000, IIST WS XVI, Hewlett-Packard Laboratories.

* cited by examiner

CONTACT PROBE STORAGE FET SENSOR

BACKGROUND OF THE INVENTION

The present invention relates generally to a sensor arrangement which is based on the use of a FET (Field Effect Transistor) which responds to changes in distance from a substrate that emits an electric field and which, due to its rapid response characteristics, finds application in at least Contact Probe Storage (CPS) arrangements.

It has been hitherto been proposed to sense data which is written onto a movable medium using a probe that is supported on a cantilever and used to contact the medium. By using heat transfer characteristics between the movable medium and the probe (or a portion of the cantilever), it is possible to determine minute changes in distance between the movable medium and the cantilever on which the probe is carried, and use this as a means for reading out the data stored on the movable medium.

In the above type of arrangement, both imaging and reading are carried out using a thermomechanical sensing concept. A heater in the cantilever that is used for writing is also used as a thermal readback sensor by exploiting a temperature-dependent resistance function. That is to say, in this type of arrangement, the resistance (R) increases nonlinearly with heating power/temperature from room temperature to a peak value of 500-700° C. The peak temperature is determined by the doping concentration in the heater platform, which ranges from $1\times10^{17}$ to $2\times10^{18}$. Above the peak temperature, the resistance drops as the number of intrinsic carriers increases because of thermal excitation.

For sensing, the resistor is operated at about 200° C. This temperature is not high enough to soften the polymer medium, as is necessary for writing, but allows the molecular energy transfer between the cantilever on which the probe is carried, and the moving medium, to remove heat and thus provide a parameter which allows the distance between the cantilever on which the probe is carried and the medium on which the probe is running to be measured.

That is to say, this thermal sensing is based on the fact that the thermal conductance between the heater platform and the storage substrate changes according to the distance between them. The medium between a cantilever and the storage substrate, in this case air, transports heat from the heater/cantilever to the storage media/substrate. When the distance between heater and sample is reduced as the probe moves into a bit indentation, heat is more efficiently transported through the air and the heater's temperature and hence its resistance decreases. Thus, changes in temperature of the continuously heated resistor are monitored while the cantilever is scanned over data bits, providing a means of detecting the bits.

Under typical operating conditions, the sensitivity of the thermomechanical sensing is even better than that of piezoresistive-strain sensing inasmuch as thermal effects in semiconductors are stronger than strain effects. A $\Delta R/R$ sensitivity of about $10^{-4}$/nm is demonstrated by the images of the 40-nm-size bit indentations. This is better than the results are obtained using the piezoresistive-strain technique.

Nevertheless, the thermal response has been found to be slower than desired and is significantly slower than the cantilever's ability to mechanically follow the data pattern written in the medium. This leads to the system's read performance being slower than it would be if it were not limited to the thermal response of the sensing system.

DETAILED DESCRIPTION OF THE EXEMPLARY EMBODIMENTS

Figure 1:
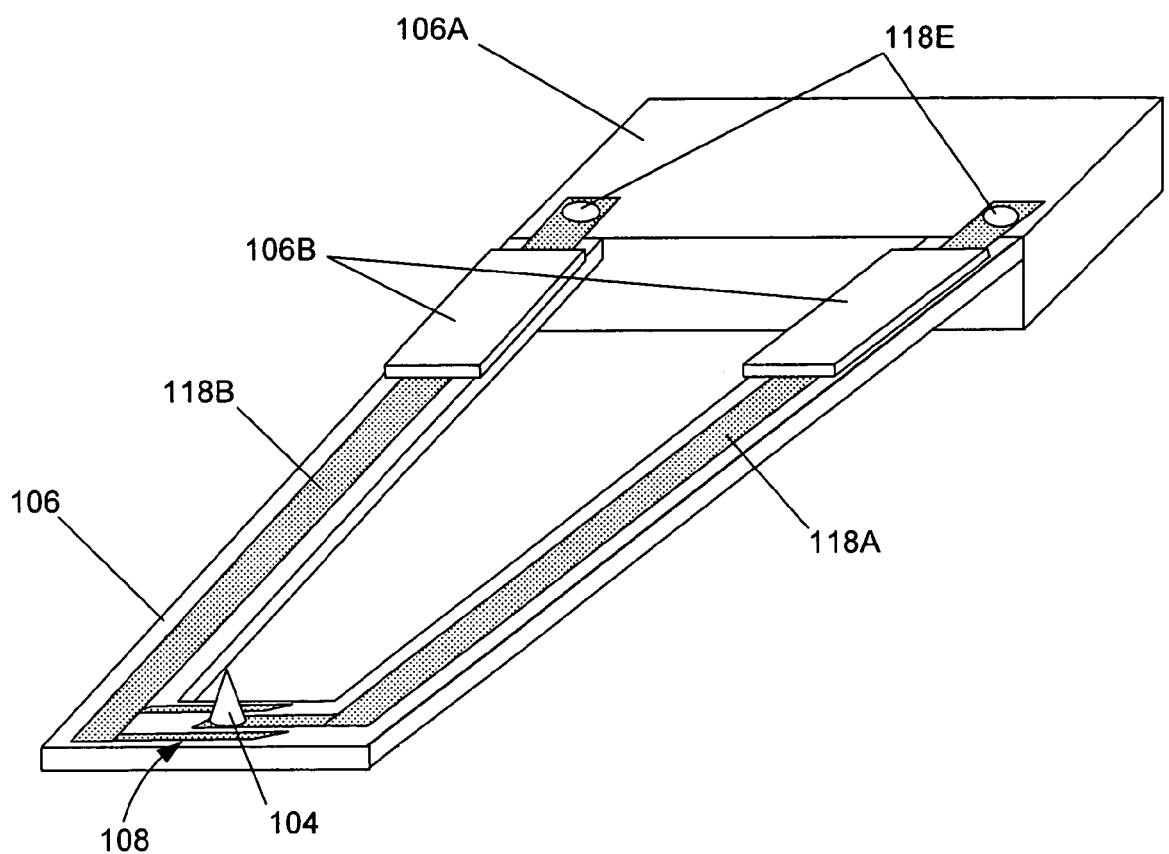
FIG. 1 is a schematic perspective view of an embodiment of a FET sensor arrangement according to the present invention.
Figure 2:
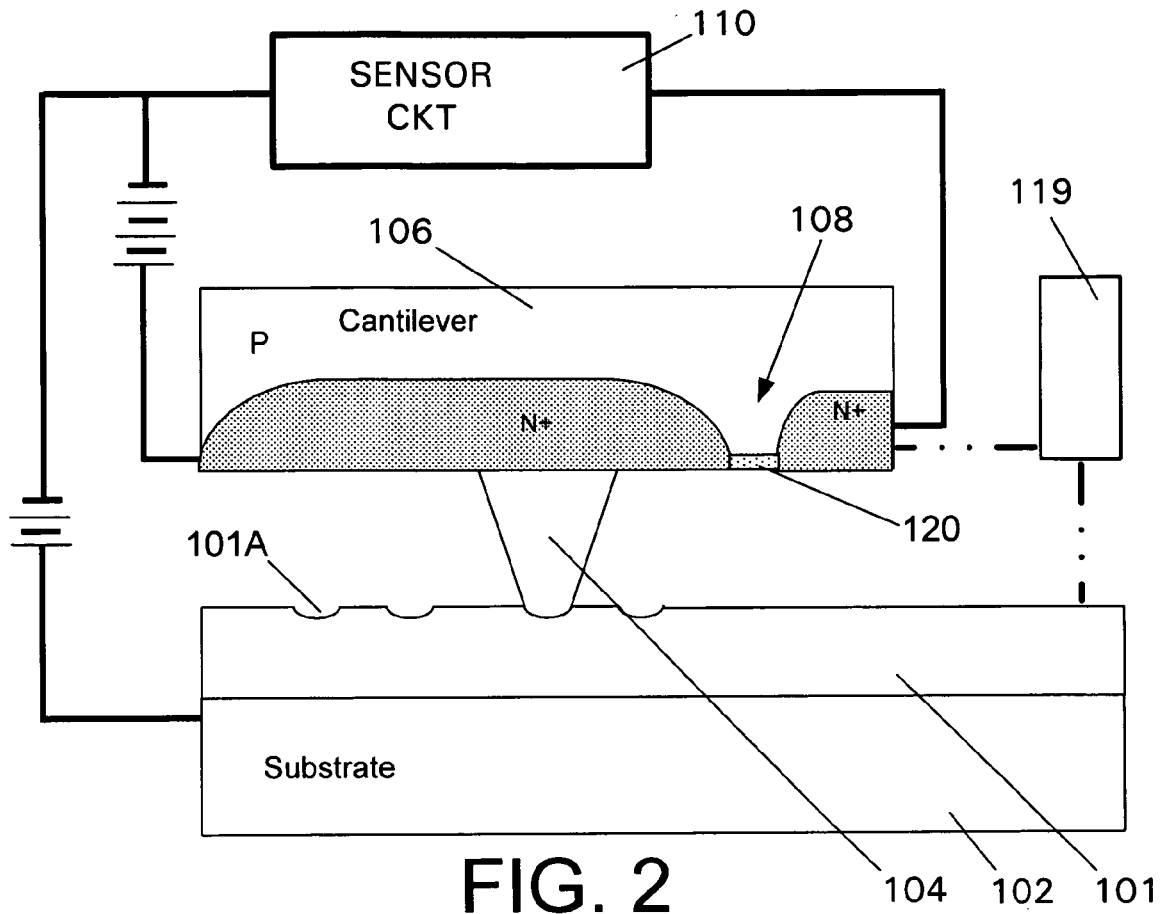
FIG. 2 is a schematic sectional view taken along section line II-II of FIG. 3 showing the arrangement according to the first embodiment of the invention.
Figure 3:
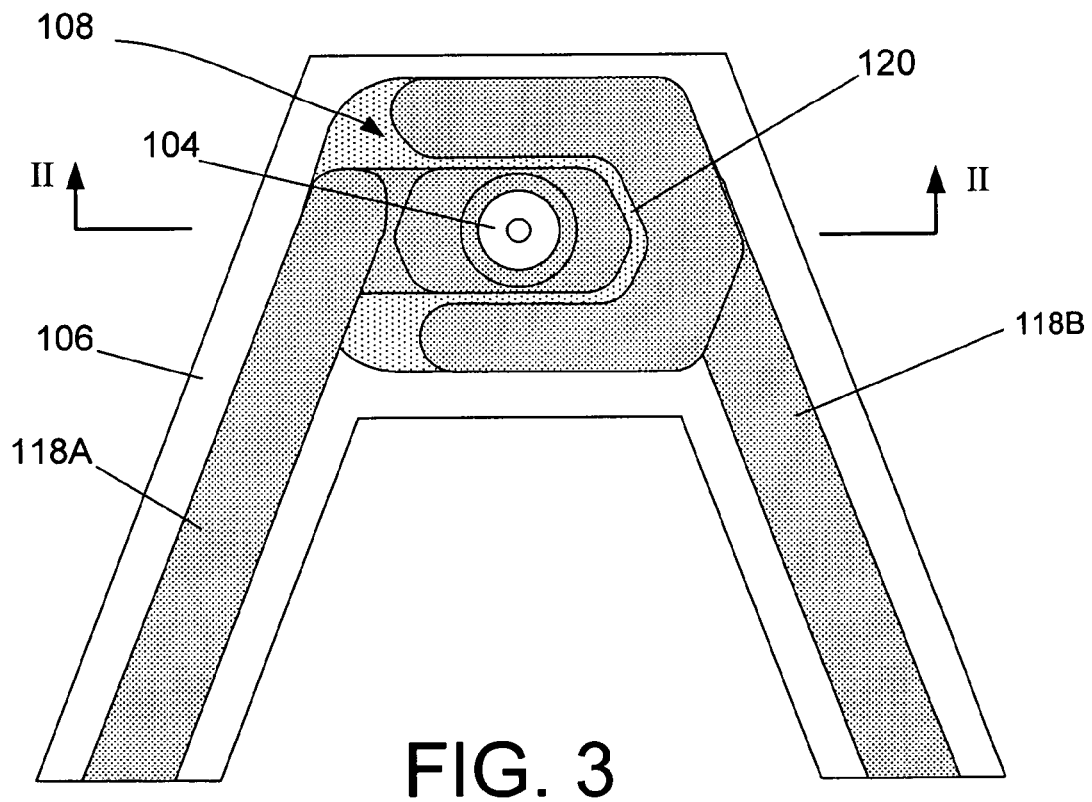
FIG. 3 is a probe side plan view of the arrangement depicted in FIG. 1.

FIGS. 1-3 show a first embodiment of the invention. FIG. 2 shows a suitable medium 101 such as a layer of polycarbonate or polymethylmethacrylate (PMMA) for example, which is formed over the surface of a suitable support substrate 102. The media 101, which in this case is non-conductive, has been heated (for example) locally to write data by forming a change in medium topography which can be detected by lowering a probe 104, which is formed at the end of the cantilever 106 in the manner depicted in FIG. 1, onto the medium.

Although the topography is shown as comprising a series of data recesses or pits 101A, these can be replaced with humps (not shown) or a combination of pits and humps. However, it should be noted that these humps (if used) should-be isolated from the pits so as not to be not confused with the raised ring that tends to form around the mouth of the pits like a lunar impact crater.

Thus, when the medium or the cantilever has been moved relative to the other to assume an exact coordinate relationship, the cantilever can be moved toward the medium. In the event that a pit 101A (or isolated hump) is located under the probe 104, the entry of the probe into the pit (or engagement with the top of the hump) indicates the presence of a data bit. Should the probe 104 not find a pit or a hump and seat on the flat surface of the medium then an absence of a data bit is indicated.

Additionally, the bits may be coded such that a particular change from one state (pit, hump or flat surface) to another state would indicate a bit and other states or changes would indicate the lack of a bit. The invention can use other coding techniques employed in contact storage device detection patterns or other responses that are predominant in the response of the sensor-media systems.

The topography of the medium 101 is thus such that the distance or air gap between the medium 101 and a cantilever 106 on which the probe 104 is formed, varies. This distance variation allows a FET (field effect transistor) 108, which is formed in the end of the cantilever 106 proximate the probe 104, to respond to changes in an electric field which is generated between the substrate 102 and the cantilever 106 and thus modulate a signal in the form of a current which passes through the FET 108 in accordance with the amount of clearance between the medium 101 and the cantilever 106.

A sensor circuit 110 is arranged to be responsive to the change in current passing through the FET 108 and thus detect the change in distance between the cantilever 106 and the medium 101.

More specifically, in this first embodiment, the source, drain and substrate 102 are circuited as schematically illustrated in FIG. 2, so as to develop a bias voltage between the source and drain of the FET 108 and the medium 101. This induces the situation where the proximity of the substrate 102 effectively gates the FET 108 and modulates the amount of current which is permitted to flow from the source to the drain through the channel which is interconnects the two.

Further, since the probe 104 moves over/contacts an electrically non-conductive medium 101, the modulation of the current passing through the FET 108 is due solely to the changes in the electrical field which are produced between the cantilever 106 and the substrate 102 which of course must be sufficiently conductive to allow for the required electrical field to be established. The cantilever 106, in this embodiment, is formed of silicon which has been doped in a known manner to produce the electrically conductive lines or traces 118A and 118B the source, drain and the channel 120.

The FET 108 in the illustrated embodiment is a depletion mode N-channel type FET. However, the embodiment is not limited to this type of FET and may be replaced with a P-channel type if desired. In depletion mode FETs, the channel is formed by doping in the channel region. The FET will conduct in varying amounts as modulated by the gate voltage. If the gate voltage is made negative enough, the carriers will be driven from the channel causing the FET to cease to conduct.

The probe 104 is formed of silicon or other suitable material and is formed using a suitable masking and etching technique.

In the embodiment illustrated in FIGS. 1-3, the medium 101 and the cantilever 106 are operatively (mechanically) connected so that medium 101 is selectively movable with respect to the cantilever 106 by way of a drive mechanism denoted by element 119 (schematically depicted in FIG. 2). This mechanism is arranged to move the two elements (viz., the cantilever 106 and the medium 101) with respect to one another to as to assume a selected coordinate relationship and position the probe 104 so that it can detect if a data indicative change in topography (e.g. a pit 101A) is present or absent at that set of coordinates.

The cantilever 106 is etched out of silicon and, as shown in FIG. 1, extends from a base block 106A and is provided with layers of cantilever activation material 106B which are formed of intrinsically stressed material and which are used to induce flexure in the cantilever 106 and move the probe 104 with respect to the medium 101. The terminal ends of the doped traces 118A and 118B are located on the base block 106A and a provided with electrical contacts 118E. The activation material 106B, however, is not limited to the use of intrinsically stressed material and can be alternatively formed of a piezoelectric material if so desired.

In as much as the above mentioned doping and etching techniques are well within the purview of the person skilled in the art of semiconductor fabrication, no further description will be given for brevity.

With this embodiment, a good sensor bandwidth can be expected inasmuch as the electric field responds as fast as the cantilever can move. The FET is thus able to respond quickly to the variations in field strength and has the potential to make the mechanics of the cantilever the limiting factor in the bandwidth. The signal to noise (SNR) for this arrangement can be expected to be improved as compared to the above-mentioned thermal type sensor in that, with the latter, much of the useful signal is filtered out by the thermal lowpass function.

Since the FET is capable of producing gain, the sensor can be expected to produces a relatively large output signal with respect to the various noise sources and thus reduce signal degradation due to these noises. Further, since the sensor does not require heat to work, the power consumption can be expected to be significantly lower.

Figure 4:
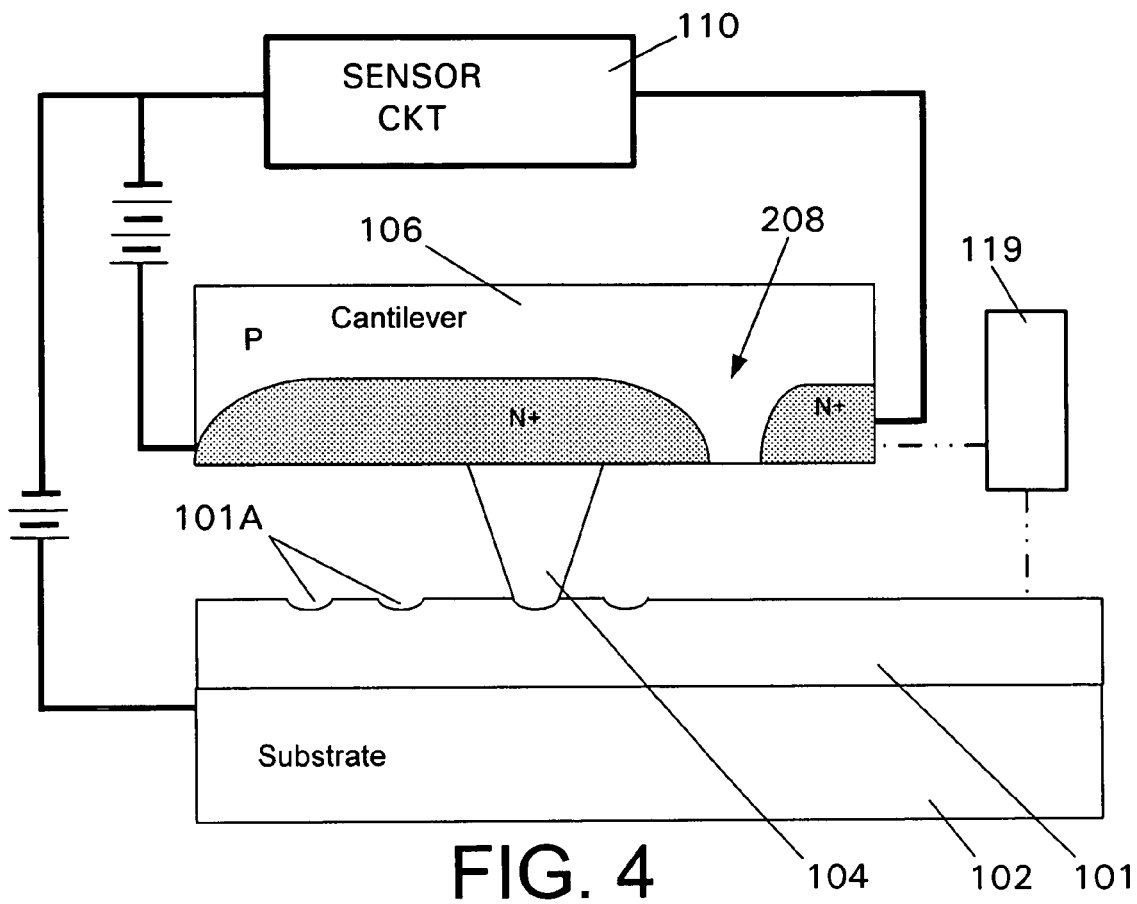
FIG. 4 is a schematic sectional view taken along section line IV-IV of FIG. 5 showing the arrangement according to a second embodiment of the invention.
Figure 5:
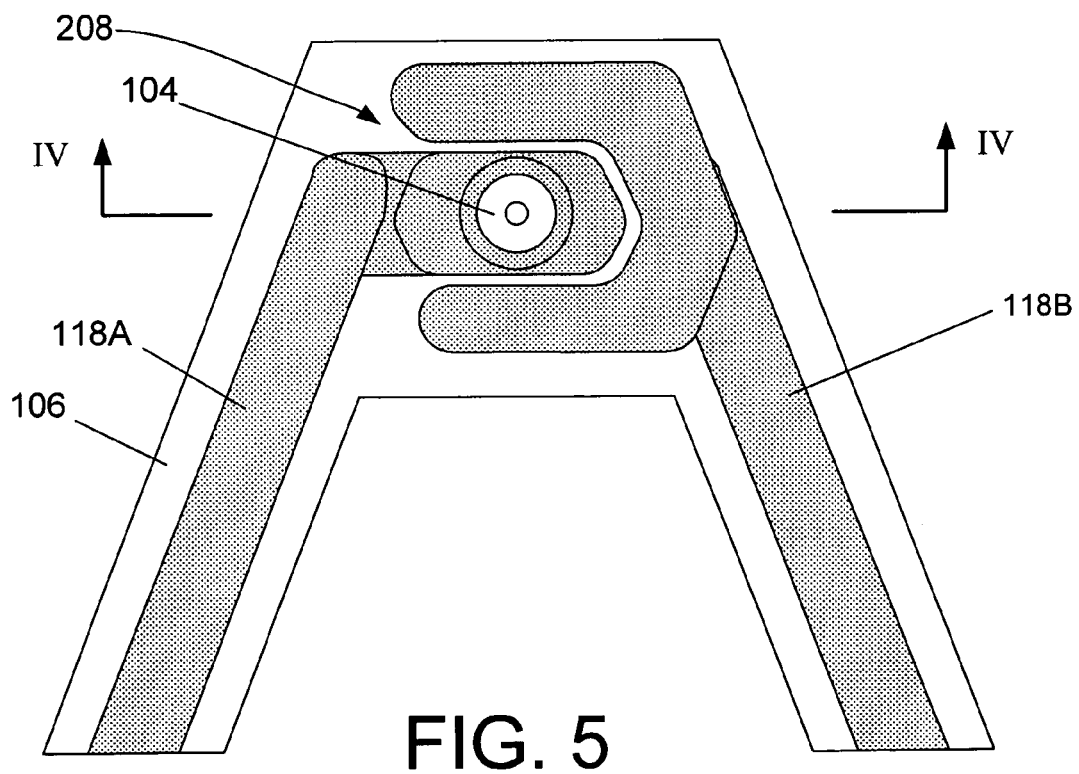
FIG. 5 is a underside plan view of the second embodiment of the invention.

FIGS. 4 and 5 show a second embodiment of the invention which utilizes another type of type of FET 208. This is an induced-channel type FET. Unlike the FET 108 of the first embodiment, this induced-channel or enhancement mode FET is such that there is no intrinsic channel and the drain to source conductance is very low until the gate voltage is applied. When the gate voltage exceeds a given threshold, enough carriers are pulled into the channel region that the device starts to conduct. In an N-channel enhancement type FET, the channel is p-type material that forms a conduction band when sufficiently positive gate voltage is applied. When conducting, the channel behaves like n-type material.

Thus, the induced-channel FET 208 used in the second embodiment conducts current from source to drain in response to the electric field that is created when a voltage is applied to the gate (viz., the substrate 102) and a channel being induced by the migration of free electrons. As with the FET of the first embodiment, the gate signal determines the amount of current flow through the channel as long as the source and drain voltages remain constant. When the gate voltage is at zero, essentially no current flows since a gate voltage is required to form a channel.

Although the invention has been disclosed with reference to a limited number of embodiments, the various modifications and variations which can be made without departing from the scope of the invention, which is limited only by the appended claims, will be self-evident to those skilled in the art of Atomic Resolution Storage (ARS) and Contact Probe Storage (CPS) technology. While the embodiments of the invention will find immediate application in mass storage devices where a large number of cantilevers are fabricated into a single reading unit for simultaneously reading the presence/absence of data indicative changed in medium topography, it should be appreciated that the use of the above disclosed FET arrangement can be used in connection with as sensors such as those used in pressure sensors, acceleration (G) sensors, microphones and position control systems.

What is claimed is:

1. A sensing system comprising:
   a cantilever disposed with a medium which is movable relative to the cantilever; and
   a device associated with a distal end of the cantilever, the device having a source, a drain and a channel therebetween;
   an electrically non-conductive probe disposed upon the either the source or the drain and separate from the channel;
   the medium having a non-conductive media disposed upon a conductive substrate, the non-conductive media having a surface in contact with the probe, the surface providing data indicative topographical features to vary the proximity distance between the substrate and the channel;
   a sensor circuit structured and arranged to develop a bias voltage between the source and drain and substrate;
   wherein varying proximity between the substrate and the channel effectively gates the device and modulates current flow from the source to the drain through the channel as a read signal.

2. A sensing system as set forth in claim 1, wherein the device is a FED (Field Effect Transistor).

3. A sensing system as set forth in claim 1, wherein the device is an inducted channel FET (Field Effect Transistor).

4. A read mechanism used in a contact atomic resolution storage system, comprising:
 a cantilever disposed with an electrically non-conductive medium which is movable relative to the cantilever, the cantilever having an electrically non-conductive probe which follows an elevationally varying topography of the medium and provides a varying proximity distance between the cantilever and a substrate on which the medium is supported; and
 a device formed in the cantilever which responds to a change in electric field induced by a change in distance between the cantilever and the substrate the device having a source, drain and a channel, the probe extending from either the source or the drain and being separate from the channel; and
 wherein varying proximity between the substrate and the channel effectively gates the device and modulates current flow from the source to the drain through the channel as a read signal.

5. A read mechanism as set forth in claim 4, wherein the device is a FET (Field Effect Transistor).

6. A read mechanism as set forth in claim 4, wherein the device is an induced channel FET (Field Effect Transistor).

7. A read mechanism used in a contact atomic resolution storage system, comprising:
 a cantilever disposed with an electrically non-conductive medium which is movable relative to the cantilever;
 a device associated with the distal end of the cantilever, the device having a source, a drain and a channel;
 the cantilever having an electrically non-conductive probe extending from either the source or the drain and in contact with a surface of the medium, the surface providing data indicative topographical features to vary the proximity distance between the substrate and the channel;
 a circuit which establishes an electrical connection between the cantilever and substrate on which the media is supported, and generates an electric field in an air gap between the cantilever and the medium; and
 wherein the device is responsive to changes in the electric field in the air gap due to varying distance between the channel and the substrate, a reduced distance providing a stronger field across the air gap to effectively gate the device.

8. A read mechanism as set forth in claim 7, wherein the device is a FET (Field Effect Transistor).

9. A read mechanism as set forth in claim 7, wherein the device is an induced channel FET (Field Effect Transistor).

10. A method of using a sensing device comprising:
 moving an electrically non-conductive probe supported on a cantilever relative to a non-conductive medium that has a data indicative elevationally varying topography followed by the probe, the medium being associated with a substrate producing an electric field; and
 sensing the change in distance between the cantilever and the medium using a change in current flowing through a FET (Field Effect Transistor) formed in the cantilever, wherein the change in current is induced by a change in electric field between the substrate and the FET, the FET having a source, drain and channel therebetween, the probe extending from either the source or the drain; and
 wherein the medium is configured so that a superficial data indicative topographical feature varying the proximity distance between the substrate and the channel is located in operative proximity to the channel of the FET.

11. A method as set forth in 10, further comprising using the change in electric field to sense the presence of a bit of data which is written into the medium.

12. A method as set forth in 11, further comprising using the data bit sensing in a mass storage device.

* * * * *

UNITED STATES PATENT AND TRADEMARK OFFICE
CERTIFICATE OF CORRECTION

PATENT NO.        : 7,436,753 B2
APPLICATION NO. : 10/736692
DATED             : October 14, 2008
INVENTOR(S)       : Robert G. Mejia et al.

It is certified that error appears in the above-identified patent and that said Letters Patent is hereby corrected as shown below:

On page 2, in field (56), under "Foreign Patent Documents", in column 2, line 3, delete "JP   08-806788 A   4/1996" and insert -- JP   08-086788 A   4/1996 --, therefor.

In column 4, line 67, in Claim 2, delete "(FED)" and insert -- (FET) --, therefor.

In column 5, line 2, in Claim 3, delete "inducted" and insert -- induced --, therefor.

Signed and Sealed this

Twenty-third Day of June, 2009

JOHN DOLL
*Acting Director of the United States Patent and Trademark Office*